US010467044B2

United States Patent
Wang et al.

(10) Patent No.: US 10,467,044 B2
(45) Date of Patent: Nov. 5, 2019

(54) TRANSACTION PROCESSING METHOD AND APPARATUS, AND COMPUTER SYSTEM

(71) Applicant: Huawei Technologies Co., Ltd., Shenzhen (CN)

(72) Inventors: Huaqing Wang, Beijing (CN); Wenlong Huang, Shenzhen (CN); Jun Xu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 221 days.

(21) Appl. No.: 15/631,585

(22) Filed: Jun. 23, 2017

(65) Prior Publication Data

US 2017/0286150 A1 Oct. 5, 2017

Related U.S. Application Data (63) Continuation of application No. PCT/CN2014/094779, filed on Dec. 24, 2014.

(51) Int. Cl.
*G06F 12/02* (2006.01)
*G06F 9/46* (2006.01)
(Continued)

(52) U.S. Cl.
CPC .......... *G06F 9/466* (2013.01); *G06F 9/30* (2013.01); *G06F 9/54* (2013.01); *G06F 11/14* (2013.01);
(Continued)

(58) Field of Classification Search
CPC ........ G06F 12/00; G06F 12/0238; G06F 9/30; G06F 11/3636
(Continued)

(56) References Cited

U.S. PATENT DOCUMENTS

| 4,507,751 | A | | 3/1985 | Gawlick et al. |
| 5,386,111 | A | * | 1/1995 | Zimmerman ........ B60S 1/0822 250/227.25 |

(Continued)

FOREIGN PATENT DOCUMENTS

| CN | 1455334 A | 11/2003 |
| CN | 101089857 A | 12/2007 |

(Continued)

OTHER PUBLICATIONS

Machine Translation and Abstract of Japanese Publication No. JP5386111, Jan. 15, 2014, 9 pages.
(Continued)

*Primary Examiner* — Tuan V Thai
(74) *Attorney, Agent, or Firm* — Conley Rose, P.C.

(57) ABSTRACT

A transaction processing method, an apparatus, and a computer system are provided. According to the method, after receiving a transaction processing request, status information of the transaction is recorded in a non-volatile memory, where the transaction processing request carries transaction data of a transaction, where the status information of the transaction includes a transaction status, a transaction identifier, and an address, and where the transaction status is an uncommitted state. The transaction data is written to the non-volatile memory according to the address. Then, the transaction status of the transaction is modified to a committed state according to the transaction identifier. Further, after writing the transaction data to an external memory of the computer system from the non-volatile memory, the transaction status of the transaction is modified to a backup state according to the transaction identifier. A transaction data processing speed can be increased in the foregoing manner.

20 Claims, 5 Drawing Sheets (51) Int. Cl.
- *G06F 16/00* (2019.01)
- *G06F 17/00* (2019.01)
- *G06F 9/30* (2018.01)
- *G06F 9/54* (2006.01)
- *G06F 11/14* (2006.01)
- *G06F 11/36* (2006.01)

(52) U.S. Cl.
CPC ...... *G06F 11/3636* (2013.01); *G06F 12/0238* (2013.01); *G06F 16/00* (2019.01); *G06F 17/00* (2013.01)

(58) Field of Classification Search
USPC .......................................................... 711/114
See application file for complete search history.

(56) References Cited

U.S. PATENT DOCUMENTS

| | | | |
|---|---|---|---|
| 8,850,141 B2* | 9/2014 | Zohar | G06F 11/2058 711/162 |
| 2004/0181560 A1 | 9/2004 | Romanufa et al. | |
| 2007/0220059 A1* | 9/2007 | Lu | G06F 16/2358 |
| 2011/0321015 A1 | 12/2011 | Chew | |
| 2015/0113243 A1* | 4/2015 | Dupaquis | G06F 21/572 711/164 |

FOREIGN PATENT DOCUMENTS

| | | |
|---|---|---|
| CN | 102831069 A | 12/2012 |
| CN | 103077222 A | 5/2013 |
| JP | H06332777 A | 12/1994 |
| JP | 2003114831 A | 4/2003 |
| JP | 2009026334 A | 2/2009 |
| JP | 2009282752 A | 12/2009 |
| JP | 5386111 B2 * | 1/2014 |
| JP | 5386111 B2 | 1/2014 |
| WO | 2014142908 A1 | 9/2014 |

OTHER PUBLICATIONS

Foreign Communication From A Counterpart Application, Korean Application No. 10-2017-7020304, Korean Notice of Preliminary Rejection dated Apr. 13, 2018, 5 pages.
Foreign Communication From A Counterpart Application, Korean Application No. 10-2017-7020304, English Translation of Korean Notice of Preliminary Rejection dated Apr. 23, 2018, 7 pages.
Machine Translation and Abstract of Chinese Publication No. CN102831069, Dec. 19, 2012, 20 pages.
Foreign Communication From A Counterpart Application, Chinese Application No. 201480045678.X, Chinese Office Action dated Aug. 21, 2018, 5 pages.
Machine Translation and Abstract of Japanese Publication No. JP2009026334, Feb. 5, 2009, 26 pages.
Machine Translation and Abstract of Japanese Publication No. JP2009282752, Dec. 3, 2009, 14 pages.
Foreign Communication From A Counterpart Application, Japanese Application No. 2017-534214, Japanese Office Action dated May 15, 2018, 5 pages.
Foreign Communication From A Counterpart Application, Japanese Application No. 2017-534214, English Translation of Japanese Office Action dated May 15, 2018, 4 pages.
Foreign Communication From A Counterpart Application, Korean Application No. 10-2017-7020304, Korean Notice of Allowance dated Sep. 7, 2018, 3 pages.
Foreign Communication From A Counterpart Application, Korean Application No. 10-2017-7020304, English Translation of Korean Notice of Allowance dated Sep. 7, 2018, 1 pages.
Machine Translation and Abstract of Chinese Publication No. CN1455334, Nov. 12, 2003, 7 pages.
Machine Translation and Abstract of Chinese Publication No. CN101089857, Dec. 19, 2007, 12 pages.
Machine Translation and Abstract of Chinese Publication No. CN103077222, May 1, 2013, 25 pages.
Foreign Communication From A Counterpart Application, PCT Application No. PCT/CN2014/094779, English Translation of International Search Report dated Sep. 25, 2015, 2 pages.
Foreign Communication From A Counterpart Application, PCT Application No. PCT/CN2014/094779, English Translation of Written Opinion dated Sep. 25, 2015, 5 pages.
Mohan, C., et al., "ARIES: A Transaction Recovery Method Supporting Fine-Granularity locking and Partial Rollbacks Using Write-ahead Logging." XP058246054, ACM Transactions on Database Systems, vol. 17, No. 1, March 1992, pp. 94-162.
Foreign Communication From A Counterpart Application, European Application No. 14908733.0, Extended European Search Report dated Nov. 27, 2017, 9 pages.
Machine Translation and Abstract of Japanese Publication No. JP2003114831, Apr. 18, 2003, 9 pages.
Machine Translation and Abstract of Japanese Publication No. JPH06332777, Dec. 2, 1994, 10 pages.
Foreign Communication From A Counterpart Application, Japanese Application No. 2017-534214, Japanese Notice of Allowance dated Aug. 28, 2018, 3 pages.

* cited by examiner

TRANSACTION PROCESSING METHOD AND APPARATUS, AND COMPUTER SYSTEM

CROSS-REFERENCE TO RELATED APPLICATIONS

This application is a continuation of International Application No. PCT/CN2014/094779, filed on Dec. 24, 2014, the disclosure of which is hereby incorporated by reference in its entirety.

TECHNICAL FIELD

This application relates to the field of transaction processing technologies, and in particular, to a transaction processing method and apparatus, and a computer system.

BACKGROUND

In many large and key application programs, a computer performs a large quantity of tasks every second. When multiple tasks are combined together to complete a service requirement, the service requirement may be referred to as a transaction. The transaction has atomicity and consistency.

To ensure the atomicity and the consistency of the transaction, a write-ahead logging (WAL) method is generally used in existing transaction processing. In an embodiment, an existing computer system includes a processor, an internal memory, and an external memory, and the internal memory is a dynamic random access memory (DRAM), and a log area is set in the external memory. When receiving a transaction processing request, the processor first writes transaction data of a transaction to the internal memory from a cache of the computer system, and then, to the log area of the external memory, writes the transaction data that has been written to the internal memory. After all transaction data of the transaction is written to the log area, the processor writes the transaction data to the external memory to commit the transaction.

However, all transaction data in the foregoing existing transaction processing method needs to be written to the internal memory before being written to the log area, and the transaction can be committed only after all the transaction data is written to the log area. That is, the transaction data needs to be written twice in a transaction processing process, which leads to a low transaction processing speed.

SUMMARY

This application provides a transaction processing method and apparatus, and a computer system such that a transaction data processing speed can be increased.

In a first aspect, an embodiment of the disclosure provides a transaction processing method, the method is applied in a computer system including a non-volatile memory, and the method includes receiving a transaction processing request, where the transaction processing request carries transaction data of a transaction, recording status information of the transaction in the non-volatile memory, where the status information of the transaction includes a transaction status, and a transaction identifier and an address that are allocated to the transaction according to the transaction processing request, the transaction status is an uncommitted state, and the uncommitted state indicates that not all the transaction data is written to the non-volatile memory, writing the transaction data to the non-volatile memory according to the address, modifying the transaction status of the transaction to a committed state according to the transaction identifier, where the committed state indicates that all the transaction data of the transaction is written to the non-volatile memory, but not all the transaction data is written to an external memory of the computer system, writing the transaction data to the external memory of the computer system from the non-volatile memory, and modifying the transaction status of the transaction to a backup state according to the transaction identifier, where the backup state indicates that all the transaction data of the transaction is written to the external memory of the computer system.

With reference to the first aspect, in a first possible embodiment of the first aspect, before the modifying the transaction status of the transaction to a committed state according to the transaction identifier, the method further includes if the computer system restarts, determining, according to the status information, recorded in the non-volatile memory, of the transaction, that the transaction status of the transaction is the uncommitted state, and deleting the transaction data and the status information of the transaction.

With reference to the first aspect or the first possible embodiment of the first aspect, in a second possible embodiment of the first aspect, after the modifying the transaction status of the transaction to a committed state according to the transaction identifier, the method further includes if the computer system restarts, determining, according to the status information, recorded in the non-volatile memory, of the transaction, that the transaction status of the transaction is the committed state, and writing the transaction data to the external memory of the computer system from the non-volatile memory.

With reference to the first aspect or the first or second possible embodiment of the first aspect, in a third possible embodiment of the first aspect, after the modifying the transaction status of the transaction to a backup state according to the transaction identifier, the method further includes deleting the transaction data of the transaction.

In a second aspect, an embodiment of the disclosure provides a transaction processing apparatus, the apparatus is applied in a computer system including a non-volatile memory, and the apparatus includes a receiving module, configured to receive a transaction processing request, where the transaction processing request carries transaction data of a transaction, a recording module, configured to record status information of the transaction in the non-volatile memory, where the status information of the transaction includes the transaction identifier, and a transaction identifier and an address that are allocated to the transaction according to the transaction processing request, the transaction status is an uncommitted state, and the uncommitted state indicates that not all the transaction data is written to the non-volatile memory, an internal memory writing module, configured to write the transaction data to the non-volatile memory according to the address, where the recording module is further configured to modify the transaction status of the transaction to a committed state according to the transaction identifier after the internal memory writing module writes the transaction data to the non-volatile memory, and the committed state indicates that all the transaction data of the transaction is written to the non-volatile memory, but not all the transaction data is written to an external memory of the computer system, and an external memory writing module, configured to write the transaction data to the external memory of the computer system from the non-volatile memory after the recording module modifies the transaction status of the transaction to the committed state, where the recording module is further configured to modify the transaction status of the transaction to a backup state according to the transaction identifier after the external memory writing module writes the transaction data to the external memory of the computer system, and the backup state indicates that all the transaction data of the transaction is written to the external memory of the computer system.

With reference to the second aspect, in a first possible embodiment of the second aspect, the apparatus further includes a status determining module, configured to before the recording module modifies the transaction status of the transaction to the committed state, if the computer system restarts, determine, according to the status information, recorded in the non-volatile memory, of the transaction, that the transaction status of the transaction is the uncommitted state, and a deletion module, configured to delete the transaction data and the status information of the transaction when the status determining module determines that the transaction status of the transaction is the uncommitted state.

With reference to the first possible embodiment of the second aspect, in a second possible embodiment of the second aspect, the status determining module is further configured to after the recording module modifies the transaction status of the transaction to the committed state, if the computer system restarts, determine, according to the status information, recorded in the non-volatile memory, of the transaction, that the transaction status of the transaction is the committed state, and trigger the external memory writing module to write the transaction data to the external memory of the computer system from the non-volatile memory.

With reference to the first or second possible embodiment of the second aspect, in a third possible embodiment of the second aspect, the deletion module is further configured to delete the transaction data of the transaction after the recording module modifies the transaction status of the transaction to the backup state.

In a third aspect, an embodiment of the disclosure provides a computer system, the computer system includes a processor and a non-volatile memory, the non-volatile memory is configured to store data, and the processor is configured to receive a transaction processing request, where the transaction processing request carries transaction data of a transaction, record status information of the transaction in the non-volatile memory, where the status information of the transaction includes the transaction identifier, and a transaction identifier and an address that are allocated to the transaction according to the transaction processing request, the transaction status is an uncommitted state, and the uncommitted state indicates that not all the transaction data is written to the non-volatile memory, write the transaction data to the non-volatile memory according to the address, modify the transaction status of the transaction to a committed state according to the transaction identifier, where the committed state indicates that all the transaction data of the transaction is written to the non-volatile memory, but not all the transaction data is written to an external memory of the computer system, write the transaction data to the external memory of the computer system from the non-volatile memory, and modify the transaction status of the transaction to a backup state according to the transaction identifier, where the backup state indicates that all the transaction data of the transaction is written to the external memory of the computer system.

With reference to the third aspect, in a first possible embodiment of the third aspect, before modifying the transaction status of the transaction to the committed state according to the transaction identifier, the processor is further configured to when the computer system restarts, determine, according to the status information, recorded in the non-volatile memory, of the transaction, that the transaction status of the transaction is the uncommitted state, and delete the transaction data and the status information of the transaction.

With reference to the third aspect or the first possible embodiment of the third aspect, in a second possible embodiment of the third aspect, after modifying the transaction status of the transaction to the committed state according to the transaction identifier, the processor is further configured to when the computer system restarts, determine, according to the status information, recorded in the non-volatile memory, of the transaction, that the transaction status of the transaction is the committed state, and write the transaction data to the external memory of the computer system from the non-volatile memory.

With reference to the third aspect or the second or third possible embodiment of the third aspect, in a third possible embodiment of the third aspect, after modifying the transaction status of the transaction to the backup state according to the transaction identifier, the processor is further configured to delete the transaction data of the transaction.

In the transaction processing method provided in the embodiments of the disclosure, a feature that data is not lost when a non-volatile memory is powered off is used, transaction data of a transaction is directly written to an external memory after being written to the non-volatile memory, and the transaction data does not need to be written to a log area. Therefore, a transaction processing process is simplified and a transaction processing speed is increased. In addition, in the embodiments of the disclosure, different transaction states are further set in the non-volatile memory to identify whether all transaction data of the transaction is written to the non-volatile memory or whether all transaction data is written to the external memory such that a computer system may determine a write status of the transaction data of the current transaction according to a transaction status. Therefore, atomicity and consistency of the transaction are ensured.

BRIEF DESCRIPTION OF DRAWINGS

To describe the technical solutions in the embodiments of the disclosure more clearly, the following briefly introduces the accompanying drawings required for describing the embodiments. The accompanying drawings in the following description are merely accompanying drawings of some embodiments of the disclosure.

DESCRIPTION OF EMBODIMENTS

In the following description, to illustrate rather than limit, specific details such as a particular system structure, an interface, and a technology are provided to make a thorough understanding of this application. However, a person skilled in the art should know that this application may be practiced in other embodiments without these specific details. In other cases, detailed descriptions of well-known apparatuses, circuits, and methods are omitted such that this application is described without being obscured by unnecessary details.

Figure 1:
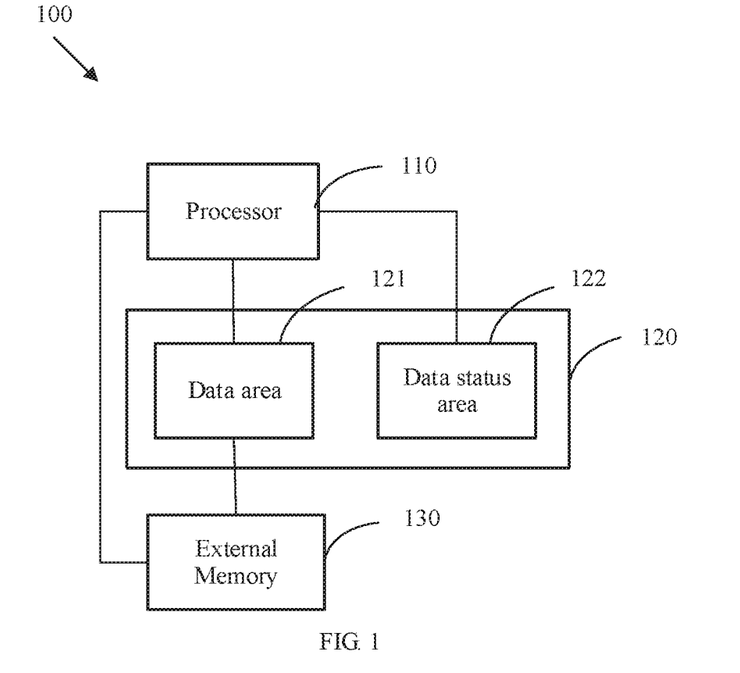
FIG. 1 is a schematic structural diagram of a computer system according to an embodiment of the disclosure.

For ease of understanding of a transaction processing method in this application, a computer system and a transaction that use the method are first described. FIG. 1 is a schematic structural diagram of a computer system according to an embodiment of the disclosure. As shown in FIG. 1, a computer system 100 includes a processor 110, a non-volatile memory 120, and an external memory 130. In this embodiment of the disclosure, a transaction may include operations that are performed by the processor 110 to write data to the external memory 130 using the non-volatile memory 120, and the data that is written to the external memory is transaction data of the transaction.

The non-volatile memory 120 is configured to temporarily store the transaction data and status information that are of the transaction. In an embodiment, a data area 121 and a data status area 122 may be set in the non-volatile memory 120. The data area 121 is used to store the transaction data of the transaction, and the data status area 122 is used to store the status information of the transaction.

In this embodiment of the disclosure, the non-volatile memory means that an internal memory is a non-volatile memory. In an embodiment, the non-volatile memory 120 may include a next-generation non-volatile memory represented by a phase change memory (PCM), a resistive random access memory (RRAM), a magnetic random access memory (A/WANT), a ferroelectric random access memory (FRAM), and the like. The next-generation non-volatile memory has a high access speed, and can address in bytes and write data to the non-volatile memory in units of bits. Therefore, the next-generation non-volatile memory can be connected to a memory bus and used as an internal memory to be directly accessed by a central processing unit (CPU). When the computer system 100 is powered off, information in the non-volatile memory 120 still exists.

The external memory 130 is configured to permanently store the transaction data of the transaction. The external memory 130 may be a hard disk drive (HDD), a solid state drive (SDD), or another memory.

The processor 110 is configured to perform the transaction processing method in this application to write the transaction data to the external memory 130 using the non-volatile memory 120. It may be understood that the processor may include the CPU, or may include another application specific integrated circuit (ASIC) or one or more integrated circuits configured to implement this embodiment of the disclosure.

Figure 2:
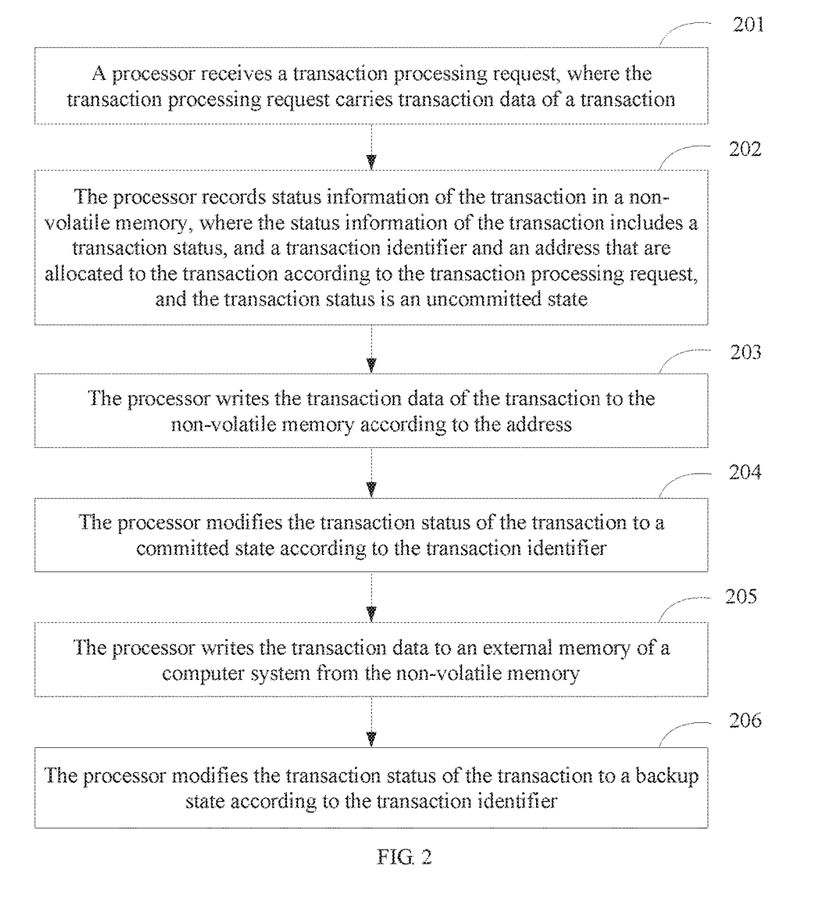
FIG. 2 is a flowchart of a transaction processing method according to an embodiment of the disclosure.

FIG. 2 is a flowchart of a transaction processing method according to an embodiment of the disclosure. The transaction processing method is applied in the computer system 100 shown in FIG. 1, and the transaction processing method performed by a processor 110 in the computer system 100 may include the following steps:

201. The processor receives a transaction processing request, where the transaction processing request carries transaction data of a transaction.

The transaction processing request may be input by a user or triggered by another program executed by the processor, for example, a write instruction input by the user.

After receiving the transaction processing request, the processor allocates a transaction identifier and an address to the transaction according to the transaction processing request. The transaction identifier is used to differentiate different transactions. The address is an address at which the transaction data of the transaction is to be written to a non-volatile memory.

202. The processor records status information of the transaction in a non-volatile memory, where the status information of the transaction includes a transaction status, and a transaction identifier and an address that are allocated to the transaction according to the transaction processing request, and the transaction status is an uncommitted state.

After allocating the transaction identifier and the address to the transaction, the processor creates the status information for the transaction. The status information of the transaction may include the transaction identifier, the transaction status, and the address. The transaction status is used to indicate a write status of the transaction data, and is mainly classified into an uncommitted state, a committed state, and a backup state. The uncommitted state indicates that not all the transaction data of the transaction is written to the non-volatile memory. The uncommitted state may be used to indicate that the transaction data of the transaction cannot be used when the processor executes another program or the computer system restarts. The committed state indicates that all the transaction data of the transaction is written to the non-volatile memory, but not all the transaction data is written to an external memory. The committed state may be used to indicate that the transaction data that is of the transaction and in the non-volatile memory can be used when the processor executes another program or the computer system restarts. The backup state indicates that all the transaction data of the transaction is written to the external memory. The backup state may be used to indicate that the transaction data of the transaction in the external memory can be used when the processor executes another program or the computer system restarts. In another manner of expression, when a transaction status of a transaction is the backup state, it indicates that processing of the transaction is complete.

For example, the processor 110 writes the transaction data of the transaction, the transaction identifier, and the address to a data status area of the non-volatile memory using an interface such as a dual in-line memory module (DIMM) interface or a Peripheral Component Interconnect Express (PCIe) interface to use the transaction data, the transaction identifier, and the address as the status information of the transaction. If the transaction identifier of the transaction is a first transaction, and the first transaction includes four pieces of transaction data, the following Table 1 is created in the data status area to record status information of the first transaction.

TABLE 1

| Transaction identifier | Transaction status | Address |
| --- | --- | --- |
| First transaction | Uncommitted state | Transaction data address 1 |
| First transaction | Uncommitted state | Transaction data address 2 |
| First transaction | Uncommitted state | Transaction data address 3 |
| First transaction | Uncommitted state | Transaction data address 4 |

In another embodiment, only one piece of status information may be created for all transaction data of a same transaction, and an address in the status information is respective addresses of all the transaction data of the transaction in the non-volatile memory. Therefore, a manner of recording the status information of the transaction is not specifically limited in this application. It should be noted that, in practical application, the computer system may record status information of multiple transactions being processed.

203. The processor writes the transaction data of the transaction to the non-volatile memory according to the address.

For example, after the status information of the transaction is recorded in the data status area, according to the address in the status information of the first transaction, the processor writes the transaction data that is of the first transaction and that is carried in the transaction processing request to a data area of the non-volatile memory using the interface such as the DIMM interface or the PCIe interface.

204. The processor modifies the transaction status of the transaction to a committed state according to the transaction identifier.

For example, after writing all the transaction data of the first transaction to the data area of the non-volatile memory, the processor searches the data status area of the non-volatile memory for status information in which a transaction identifier is the first transaction, and modifies the transaction status in the status information of the first transaction to the committed state, as shown in the following Table 2. In this case, the first transaction is committed.

TABLE 2

| Transaction identifier | Transaction status | Address |
|---|---|---|
| First transaction | Committed state | Transaction data address 1 |
| First transaction | Committed state | Transaction data address 2 |
| First transaction | Committed state | Transaction data address 3 |
| First transaction | Committed state | Transaction data address 4 |

205. The processor writes the transaction data to an external memory of a computer system from the non-volatile memory.

For example, after the first transaction is committed, the processor writes the transaction data of the first transaction to the external memory from the data area of the non-volatile memory using an interface such as a serial advanced technology attachment (SATA) interface or a network driver.

206. The processor modifies the transaction status of the transaction to a backup state according to the transaction identifier.

For example, after writing all the transaction data of the first transaction to the external memory, the processor searches the data status area of the non-volatile memory for the status information in which the transaction identifier is the first transaction, and modifies the transaction status in the status information of the first transaction to the backup state, as shown in the following Table 3. In this case, the transaction data of the first transaction is successfully written to the external memory, and the first transaction ends.

TABLE 3

| Transaction identifier | Transaction status | Address |
|---|---|---|
| First transaction | Backup state | Transaction data address 1 |
| First transaction | Backup state | Transaction data address 2 |
| First transaction | Backup state | Transaction data address 3 |
| First transaction | Backup state | Transaction data address 4 |

Descriptions with reference to practical application are as follows: A user creates a new file A in a computer system and performs a write operation on the file A. In this case, a processor receives a write operation instruction of the user, and needs to process a transaction of writing the file A to a file system of an external memory. In an embodiment, when receiving the write instruction of the user, the processor allocates a transaction identifier and an address to the transaction, and records status information of the transaction in a data status area of a non-volatile memory, where a transaction status in the status information is an uncommitted state. After creating the status information of the transaction, the processor writes the file A to a data area of the non-volatile memory. After writing the file A, the processor modifies the transaction status in the status information of the transaction to a committed state. In this case, the transaction is committed, that is, the write operation of the user is implemented. In this case, if the processor receives an instruction of reading the file A, the processor may read the file A, from the non-volatile memory, but actually the file A is not written to a file system of the external memory, that is, the file A cannot be permanently stored in the computer system. Therefore, after the transaction is committed, the file A in the data area is written to the file system of the external memory. In this case, the transaction ends.

In an embodiment, to save storage space of the non-volatile memory, after modifying the transaction status of the transaction to the backup state, the processor may delete the transaction data that is of the transaction and in the non-volatile memory, and may further delete the status information that is of the transaction and in the non-volatile memory. When both the transaction data and the status information that are of the transaction are deleted, a sequence of deleting the transaction data of the transaction and deleting the status information of the transaction by the processor is not limited.

Alternatively, if the non-volatile memory has relatively sufficient storage space, after modifying the transaction status of the transaction to the backup state, the processor may not delete the transaction data that is of the transaction and in the non-volatile memory such that when the transaction data of the transaction needs to be used subsequently, the transaction data of the transaction does not need to be read from the external memory, and may be directly read from the internal memory, which accelerates a reading speed.

In this embodiment of the disclosure, a feature that data is not lost when a non-volatile memory is powered off is used, transaction data of a transaction is directly written to an external memory after being written to the non-volatile memory, and the transaction data does not need to be written to a log area. Therefore, a transaction processing process is simplified and a transaction processing speed is increased. In addition, in this embodiment of the disclosure, different transaction states are further set in the non-volatile memory to identify whether all transaction data of the transaction is written to the non-volatile memory or whether all transaction data is written to the external memory such that a computer system may determine a write status of the transaction data of the current transaction according to a transaction status. Therefore, atomicity and consistency of the transaction are ensured.

In addition, previously stored data does not need to be erased when data is written to the non-volatile memory, and a data read/write speed of the non-volatile memory is higher than that of a common DRAM. Therefore, when the non-volatile memory is used as an internal memory to which the transaction data is written, a speed of reading or writing the transaction data is greatly increased, that is, the transaction processing speed is further increased.

Optimally, in the transaction processing method in this application, transaction recovery may further be implemented, that is, in a process of performing the foregoing transaction processing method, if the computer system restarts, the processor may recover the transaction according to the transaction status that is of the transaction and in the non-volatile memory.

Figure 3A:
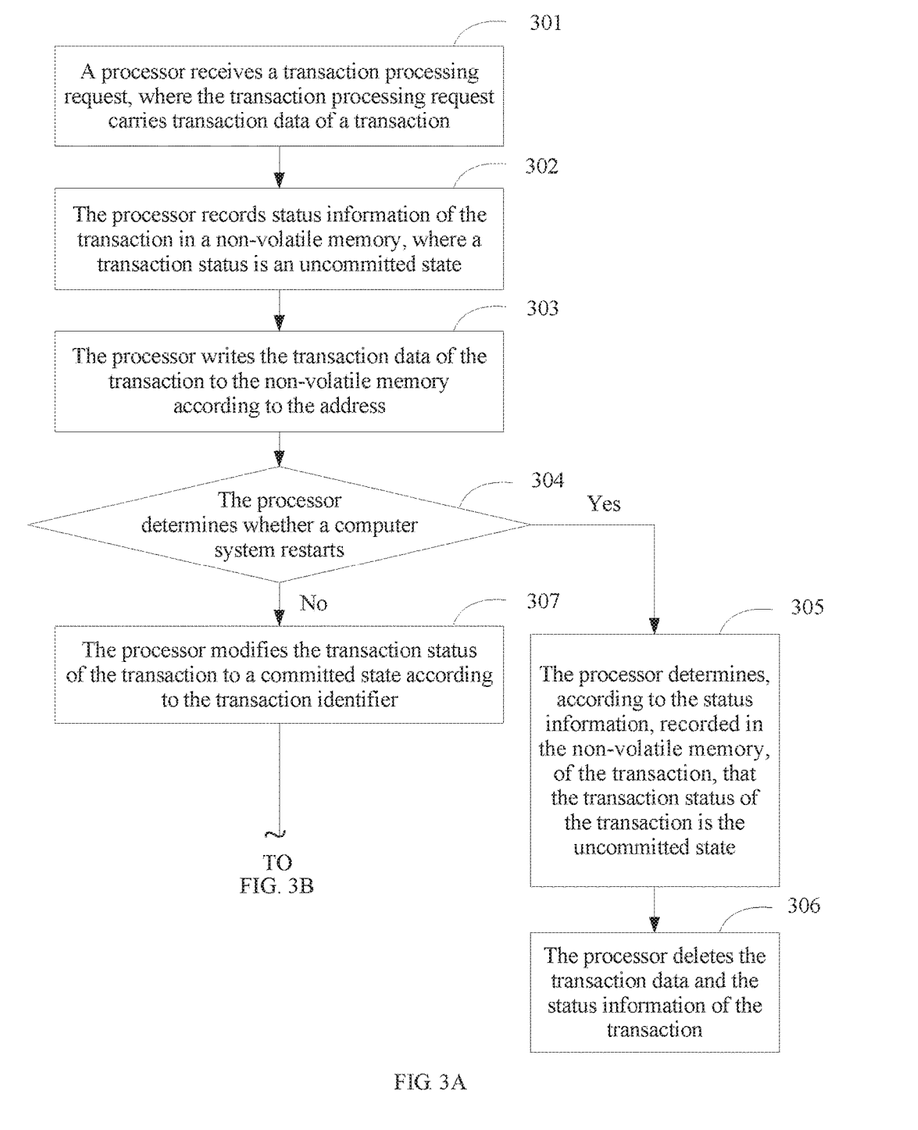
FIG. 3A and FIG. 3B are a flowcharts of another transaction processing method according to an embodiment of the disclosure.
Figure 3B:
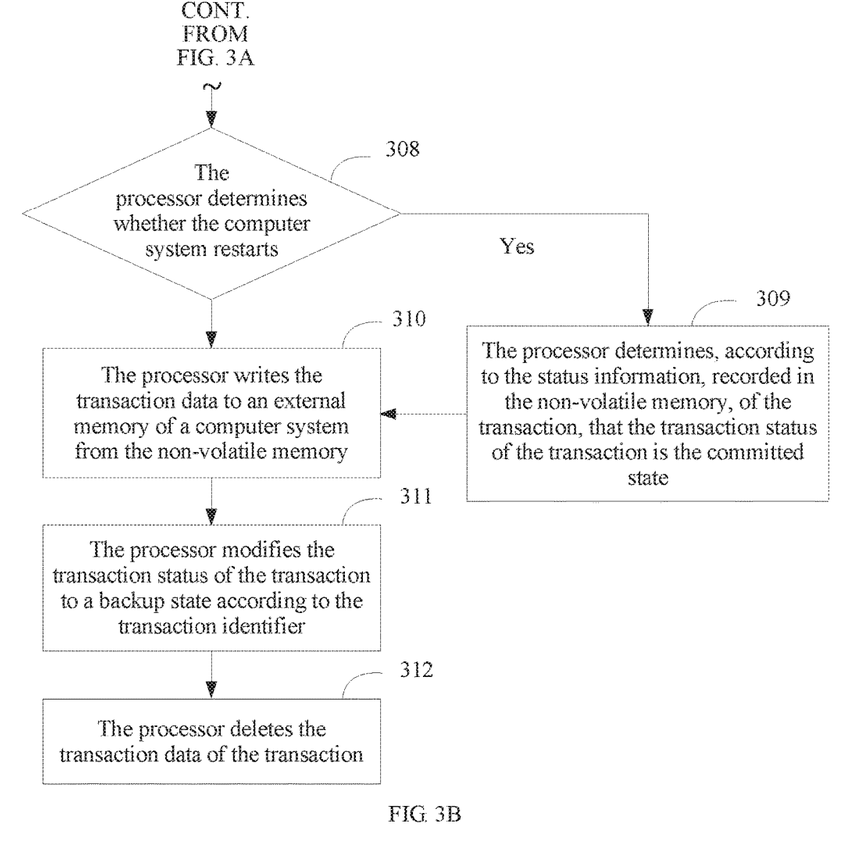

In an embodiment, FIG. 3A and FIG. 3B, FIG. 3A and FIG. 3B are a flowchart of another transaction processing method according to an embodiment of the disclosure. In this embodiment, the method is applied in a computer system including a non-volatile memory, and the method is performed by a processor in the computer system. The method includes the following steps:

301. The processor receives a transaction processing request, where the transaction processing request carries transaction data of a transaction.

302. The processor records status information of the transaction in a non-volatile memory, where the status information of the transaction includes a transaction status, and a transaction identifier and an address that are allocated to the transaction according to the transaction processing request, and the transaction status is an uncommitted state.

303. The processor writes the transaction data to the non-volatile memory according to the address.

304. The processor determines whether the computer system restarts, and if the computer system restarts, performs step 305, or if the computer system does not restart, performs step 307.

305. The processor determines, according to the status information, recorded in the non-volatile memory, of the transaction, that the transaction status of the transaction is the uncommitted state.

For example, when the processor writes transaction data of a first transaction to the non-volatile memory, if the computer system restarts after a power failure or a crash, the processor determines, according to status information that is of the first transaction and in the non-volatile memory, that a transaction status of the first transaction is the uncommitted state. The status information that is of the first transaction and in the non-volatile memory is shown in the foregoing Table 1.

306. The processor deletes the transaction data and the status information of the transaction.

For example, the processor determines that the transaction status of the first transaction is the uncommitted state, which indicates that before the computer system restarts, not all the transaction data of the first transaction is updated to a data area of the non-volatile memory. Therefore, the transaction data that is of the first transaction and in the non-volatile memory cannot be updated to an external memory according to atomicity of the transaction. Therefore, the processor deletes all transaction data that is of the first transaction and in the data area of the non-volatile memory, and deletes the status information that is of the first transaction and in a data status area, that is, the foregoing Table 1 is deleted to implement transaction rollback.

307. The processor modifies the transaction status of the transaction to a committed state according to the transaction identifier.

308. The processor determines whether the computer system restarts, and if the computer system restarts, performs step 309, or if the computer system does not restart, performs step 310.

309. The processor determines, according to the status information, recorded in the non-volatile memory, of the transaction, that the transaction status of the transaction is the committed state, and performs step 310.

For example, after the processor modifies the transaction status of the first transaction to the committed state, if the computer system restarts after a power failure or a crash, the processor determines, according to the status information that is of the first transaction and in the non-volatile memory, that the transaction status of the first transaction is the committed state, which also indicates that before the computer system restarts, all the transaction data of the first transaction is updated to the data area of the non-volatile memory. The status information that is of the first transaction and in the non-volatile memory is shown in the foregoing Table 2. Therefore, the processor performs step 310 according to consistency of the transaction to write the transaction data that is of the first transaction and in the data area to the external memory.

310. The processor writes the transaction data to an external memory of a computer system from the non-volatile memory.

311. The processor modifies the transaction status of the transaction to a backup state according to the transaction identifier.

312. The processor deletes the transaction data of the transaction.

After the processor modifies the transaction status of the transaction to the backup state, if the computer system restarts, the processor determines, according to the status information that is of the transaction and in the non-volatile memory, that the transaction status of the transaction is the backup state, which also indicates that before the computer system restarts, all the transaction data of the transaction is updated to the external memory. The status information that is of the transaction and in the non-volatile memory is shown in the foregoing Table 3. Therefore, the processor may delete the transaction data and the status information that are of the transaction to reclaim storage space of the non-volatile memory.

It should be noted that the flowchart shown in FIG. 3A and FIG. 3B is only used to describe a transaction recovery process in this application more clearly, but should not be understood as a limit on steps of the method in this application. Essentially, the processor may not determine whether the computer system restarts. The step, performed by the processor, of determining whether the computer system restarts in FIG. 3A and FIG. 3B indicates only a description of a status of the computer system, that is, indicating that if the computer system restarts in this case, the processor performs a step corresponding to "Yes" in FIG. 3A and FIG. 3B, and if the computer system does not restart, the processor performs a step corresponding to "No" in FIG. 3A and FIG. 3B. In addition, a status of whether the computer system restarts may not be limited being after step 303 or step 307, but may appear before or after the processor performs any step shown in FIG. 1, or in a process of performing any step shown in FIG. 1. However, regardless of a step in which the computer system restarts, the processor in this application performs corresponding transaction recovery steps according to the following principles Before the transaction status of the transaction is modified to the committed state according to the transaction identifier, if the computer system restarts, the processor determines that the transaction status of the transaction is the uncommitted state, and performs transaction recovery steps 305 and 306, after the transaction status of the transaction is modified to the committed state according to the transaction identifier, if the computer system restarts, the processor determines that the transaction status of the transaction is the committed state, and performs transaction recovery steps 310 and 311.

In this embodiment, a feature that data is not lost when a non-volatile memory is powered off is used, and transaction data is stored in the non-volatile memory such that when a computer system restarts in a transaction processing process, the transaction data that is of a transaction and in the non-volatile memory is not lost, and the transaction data of the transaction may be directly recovered from the non-volatile memory. Therefore, a transaction recovery speed is increased. In addition, a transaction status is set in the non-volatile memory to identify whether all transaction data of the transaction is written to the non-volatile memory and whether all the transaction data is written to an external memory. When the computer system restarts in the transaction processing process, a write status of the transaction data of the transaction may be determined according to the transaction status. When not all the transaction data of the transaction is written to the non-volatile memory, the transaction data of the transaction is not written to the external memory, and the transaction data of the transaction is directly deleted. The transaction data is written to the external memory only when all the transaction data of the transaction is written to the non-volatile memory but is not written to the external memory. Therefore, atomicity and consistency of the transaction are ensured.

Figure 4:
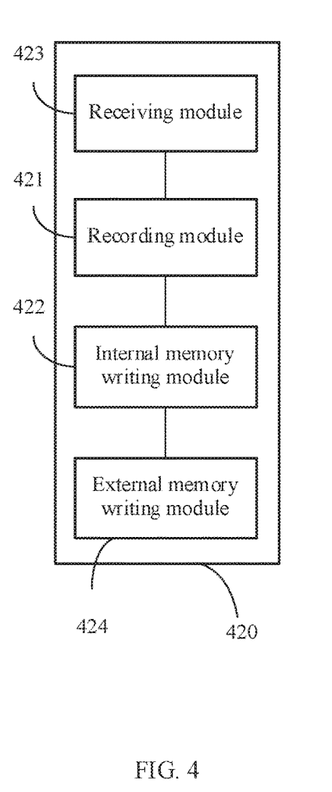
FIG. 4 is a schematic structural diagram of a transaction processing apparatus according to an embodiment of the disclosure.

FIG. 4 is a schematic structural diagram of a transaction processing apparatus according to an embodiment of the disclosure. In this embodiment, the apparatus is applied in a computer system including a non-volatile memory and an external memory. A data area and a data status area may be set in the non-volatile memory. The data area is used to store transaction data of a transaction, and the data state area is used to store status information of the transaction. In this application, a feature that data is not lost when a non-volatile memory is powered off is used such that reliability of the transaction data and the status information is ensured. A transaction processing apparatus 420 includes a receiving module 423, a recording module 421, an internal memory writing module 422, and an external memory writing module 424.

The receiving module 423 is configured to receive a transaction processing request, where the transaction processing request carries transaction data of a transaction.

The transaction processing request may be input by a user or triggered by another program executed by a processor, for example, a write instruction input by the user.

After receiving the transaction processing request, the receiving module 423 may further allocate a transaction identifier and an address to the transaction according to the transaction processing request. The transaction identifier is used to differentiate different transactions. The address is an address at which the transaction data of the transaction is to be written to the non-volatile memory.

The recording module 421 is configured to record the status information of the transaction in the non-volatile memory, where the status information of the transaction includes the transaction identifier, and the transaction identifier and the address that are allocated to the transaction according to the transaction processing request, and the transaction status is an uncommitted state.

When the receiving module 423 allocates the identifier and the address to the transaction, the recording module 421 creates the status information for the transaction. The status information of the transaction may include the transaction identifier, the transaction status, and the address. The transaction status is used to indicate a write status of the transaction data of the transaction, and is mainly classified into an uncommitted state, a committed state, and a backup state.

The uncommitted state indicates that not all the transaction data is written to the non-volatile memory, that is, the uncommitted state indicates is used to indicate that the transaction data of the transaction cannot be used when the computer system executes another program or the computer system restarts. The committed state indicates that all the transaction data of the transaction is written to the non-volatile memory, but not all the transaction data is written to an external memory of the computer system, that is, the committed state is used to indicate that the transaction data of the transaction can be used when the computer system executes another program or the computer system restarts. The backup state indicates that all the transaction data of the transaction is written to the external memory, that is, the backup state is used to indicate that the transaction data of the transaction in the external memory can be used when the computer system executes another program or the computer system restarts, that is, the transaction ends.

For example, if the transaction identifier of the transaction is a first transaction, and the first transaction includes four pieces of transaction data, the foregoing Table 1 is created in the data status area to record status information of the first transaction.

In another embodiment, only one piece of status information may be created for all transaction data of a same transaction, and an address in the status information is respective addresses of all the transaction data of the transaction in the non-volatile memory. Therefore, a manner of recording the status information of the transaction is not specifically limited in this application.

The internal memory writing module 422 is configured to write the transaction data to the non-volatile memory according to the address.

For example, after the recording module 421 records the status information of the transaction, the internal memory writing module 422 writes the transaction data that is of the first transaction and that is carried in the transaction processing request to the data area of the non-volatile memory according to the address in the status information of the first transaction.

The recording module 421 is further configured to modify the transaction status of the transaction to a committed state according to the transaction identifier after the internal memory writing module 422 writes the transaction data to the non-volatile memory.

For example, after the internal memory writing module 422 writes all transaction data of the first transaction to the data area of the non-volatile memory, the recording module 421 searches the data status area of the non-volatile memory for status information in which a transaction identifier is the first transaction, and modifies the transaction status in the status information of the first transaction to the committed state, as shown in the foregoing Table 2. In this case, the first transaction is committed.

The external memory writing module 424 is configured to write the transaction data to the external memory of the computer system from the non-volatile memory after the recording module 421 modifies the transaction status of the transaction to the committed state.

For example, after the first transaction is committed, the external memory writing module 424 writes the transaction data of the first transaction to the external memory from the data area of the non-volatile memory.

The recording module 421 is further configured to modify the transaction status of the transaction to a backup state according to the transaction identifier after the external memory writing module 424 writes the transaction data to the external memory of the computer system.

For example, after the external memory writing module 424 writes all the transaction data of the first transaction to the external memory, the recording module 421 searches the data status area of the non-volatile memory for the status information in which the transaction identifier is the first transaction, and modifies the transaction status in the status information of the first transaction to the backup state, as shown in the foregoing Table 3. In this case, the transaction data of the first transaction is successfully written to the external memory, and processing of the first transaction ends.

In an embodiment, to save storage space of the non-volatile memory, after the transaction status of the transaction is modified to the backup state, the transaction data and the status information that are of the transaction and in the non-volatile memory may be deleted. A sequence of deleting the transaction data of the transaction and deleting the status information of the transaction is not limited. Alternatively, if the non-volatile memory has relatively sufficient storage space, after the transaction status of the transaction is modified to the backup state, the transaction data that is of the transaction and in the non-volatile memory may not be deleted such that when the transaction data of the transaction needs to be used subsequently, the transaction data of the transaction does not need to be read from the external memory, and may be directly read from the internal memory, which accelerates a reading speed.

Optimally, the transaction processing apparatus in this application may further implement transaction recovery, that is, in a process of performing the foregoing transaction processing method, if the computer system restarts, the transaction processing apparatus may recover the transaction according to the transaction status that is of the transaction and in the non-volatile memory.

Figure 5:
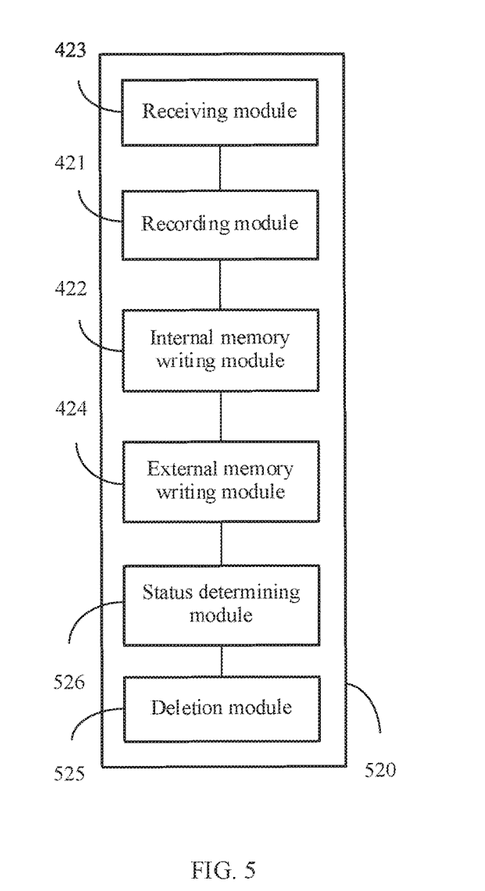
FIG. 5 is a schematic structural diagram of another transaction processing apparatus according to an embodiment of the disclosure.

In an embodiment, FIG. 5 is a schematic structural diagram of another transaction processing apparatus according to an embodiment of the disclosure. In this embodiment, optimal than the processing transaction processing apparatus 420 in the foregoing embodiment, a transaction processing apparatus 520 further includes a status determining module 526 and a deletion module 525.

The status determining module 525 is configured to before the recording module 421 modifies the transaction status of the transaction to the committed state, if the computer system restarts, determine, according to the status information, recorded in the non-volatile memory, of the transaction, that the transaction status of the transaction is the uncommitted state.

For example, when the internal memory writing module 422 writes the transaction data of the first transaction to the non-volatile memory, if the computer system restarts after a power failure or a crash, the status determining module 525 determines, according to the status information that is of the first transaction and in the non-volatile memory, that the transaction status of the first transaction is the uncommitted state. The status information that is of the first transaction and in the non-volatile memory is shown in the foregoing Table 1.

The deletion module 526 is configured to delete the transaction data and the status information of the transaction when the status determining module 525 determines that the transaction status of the transaction is the uncommitted state.

For example, the deletion module 526 deletes all the transaction data that is of the first transaction and in the data area of the non-volatile memory, and deletes status information that is of the first transaction and in the data status area of the non-volatile memory, that is, the foregoing Table 1 is deleted to implement transaction rollback.

In an embodiment, the status determining module 525 is further configured to after the recording module 421 modifies the transaction status of the transaction to the committed state, if the computer system restarts, determine, according to the status information, recorded in the non-volatile memory, of the transaction, that the transaction status of the transaction is the committed state, and trigger the external memory writing module 424 to write the transaction data to the external memory of the computer system from the non-volatile memory.

For example, after the recording module 421 modifies the transaction status of the first transaction to the committed state, if the computer system restarts after a power failure or a crash, the status determining module 525 determines, according to the status information that is of the first transaction and in the non-volatile memory, that the transaction status of the first transaction is the committed state, and writes the transaction data that is of the first transaction and in the non-volatile memory to the external memory. The status information that is of the first transaction and in the non-volatile memory is shown in the foregoing Table 2.

In an embodiment, to save storage space of the non-volatile memory, the deletion module 526 is further configured to delete the transaction data of the transaction after the recording module 421 modifies the transaction status of the transaction to the backup state to reclaim the storage space of the non-volatile memory.

It may be understood that, in another embodiment, if the non-volatile memory has relatively sufficient storage space, the transaction processing apparatus 520 performs no operation after the transaction status of the transaction is modified to the backup state.

This application further provides a computer system. FIG. 1 is a schematic structural diagram of an embodiment of a computer system in this application. In this embodiment, a computer system 100 includes a processor 110, a non-volatile memory 120, and an external memory 130. The processor 110 may be connected to the non-volatile memory 120 using an interface such as a DIMM interface or a PCIe interface, and the non-volatile memory 120 may be connected to the external memory 130 using an interface such as a SATA interface or a network drive.

Both the non-volatile memory 120 and the external memory 130 are configured to store data. In an embodiment, the non-volatile memory 120 is configured to temporally store processing data of the processor 110, such as transaction data and status information that are of a transaction processed by the processor 110. The external memory 130 is configured to permanently store data of the computer system, such as transaction data processed by the processor 110.

The processor 110 may also be referred to as a CPU, and is configured to receive a transaction processing request, where the transaction processing request carries transaction data of a transaction, record status information of the transaction in the non-volatile memory 120, where the status information of the transaction includes the transaction identifier, and a transaction identifier and an address that are allocated to the transaction according to the transaction processing request, the transaction status is an uncommitted state, and the uncommitted state indicates that not all the transaction data is written to the non-volatile memory 120, write the transaction data to the non-volatile memory 120 according to the address, modify the transaction status of the transaction to a committed state according to the transaction identifier, where the committed state indicates that all the transaction data of the transaction is written to the non-volatile memory, but not all the transaction data is written to the external memory 130 of the computer system, write the transaction data to the external memory 130 of the computer system from the non-volatile memory 120, and modify the transaction status of the transaction to a backup state according to the transaction identifier, where the backup state indicates that all the transaction data of the transaction is written to the external memory 130 of the computer system.

In an embodiment, before modifying the transaction status of the transaction to the committed state according to the transaction identifier, the processor 110 is configured to when the computer system restarts, determine, according to the status information, recorded in the non-volatile memory 120, of the transaction, that the transaction status of the transaction is the uncommitted state, and delete the transaction data and the status information of the transaction.

In an embodiment, after modifying the transaction status of the transaction to the committed state according to the transaction identifier, the processor 110 is further configured to when the computer system restarts, determine, according to the status information, recorded in the non-volatile memory 120, of the transaction, that the transaction status of the transaction is the committed state, and write the transaction data to the external memory 130 of the computer system from the non-volatile memory 120.

In an embodiment, after modifying the transaction status of the transaction to the backup state according to the transaction identifier, the processor 110 is further configured to delete the transaction data of the transaction.

In an embodiment, the non-volatile memory 120 may include a data area 121 and a data status area 122. The data area is used to store the transaction data of the transaction, and the data status area is used to store the status information of the transaction.

In this embodiment of the disclosure, the processor 110 may be an integrated circuit chip and has a signal processing capability. In an implementation process, the steps in the foregoing methods may be completed by means of an integrated logic circuit of hardware in the processor 110 or an instruction in a form of software. The foregoing processor 110 may be a general processor, a digital signal processor (DSP), an ASIC, a field programmable gate array (FPGA) or another programmable logic component, a discrete gate or a transistor logic component, or a discrete hardware component, and may implement or perform methods, steps, and logical block diagrams disclosed in the embodiments of the disclosure. The general purpose processor may be a microprocessor, or the processor may be any conventional processor or the like. Steps of the methods disclosed with reference to the embodiments of the disclosure may be directly executed and completed by a hardware decoding processor, or may be executed and completed using a combination of hardware and software modules in a decoding processor. The software module may be located in a mature storage medium in the field, such as a random access memory (RAM), a flash memory, a read-only memory (ROM), a programmable ROM, an electrically-erasable programmable memory, or a register. The storage medium is located in the external memory 130. The processor 110 reads information in the external memory 130 and completes the steps in the foregoing methods in combination with hardware of the processor.

In the foregoing solution, a feature that data is not lost when a non-volatile memory is powered off is used, and transaction data of a transaction is directly written to an external memory after being written to the non-volatile memory, and the transaction data does not need to be written to a log area. Therefore, a transaction processing process is simplified and a transaction processing speed is increased. In addition, in the embodiments of the disclosure, different transaction states are further set in the non-volatile memory to identify whether all transaction data of the transaction is written to the non-volatile memory or whether all transaction data is written to the external memory such that a computer system may determine a write status of the transaction data of the current transaction according to a transaction status. Therefore, atomicity and consistency of the transaction are ensured.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be that are allocated on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this application. The foregoing storage medium includes any medium that can store program code, such as a universal serial bus (USB) flash drive, a removable hard disk, a ROM, a RAM, a magnetic disk, or an optical disc.

What is claimed is:

1. A transaction processing method, wherein the method is applied in a computer system comprising a non-volatile memory, and wherein the method comprises:
receiving a transaction processing request, wherein the transaction processing request carries transaction data of a transaction;
recording status information of the transaction in the non-volatile memory, wherein the status information of the transaction comprises a transaction status, a transaction identifier, and an address that are each allocated to the transaction according to the transaction processing request, wherein the transaction status is an uncommitted state, and wherein the uncommitted state indicates that not all the transaction data is written to the non-volatile memory;
writing the transaction data to the non-volatile memory according to the address;
modifying the transaction status of the transaction to a committed state according to the transaction identifier, wherein the committed state indicates that all the transaction data of the transaction is written to the non-volatile memory and not all the transaction data is written to an external memory of the computer system;
writing the transaction data to the external memory of the computer system from the non-volatile memory; and
modifying the transaction status of the transaction to a backup state according to the transaction identifier, wherein the backup state indicates that all the transaction data of the transaction is written to the external memory of the computer system, and wherein the transaction status indicates a write status distinguishing between uncommitted, committed to non-volatile memory, and backed up to external memory.

2. The method according to claim 1, wherein before modifying the transaction status of the transaction to the committed state according to the transaction identifier, the method further comprises:
determining, according to the status information of the transaction recorded in the non-volatile memory, that the transaction status of the transaction is the uncommitted state when the computer system restarts; and
deleting the transaction data and the status information of the transaction.

3. The method according to claim 1, wherein after modifying the transaction status of the transaction to the committed state according to the transaction identifier, the method further comprises:
determining, according to the status information of the transaction recorded in the non-volatile memory, that the transaction status of the transaction is the committed state when the computer system restarts; and
writing the transaction data to the external memory of the computer system from the non-volatile memory.

4. The method according to claim 1, wherein after modifying the transaction status of the transaction to the backup state according to the transaction identifier, the method further comprises deleting the transaction data of the transaction.

5. The method according to claim 1, wherein writing the transaction data is written to non-volatile memory and the external memory without writing to a log area.

6. The method according to claim 1, wherein the uncommitted state indicates that the transaction data of the transaction cannot be used when the computer system restarts or executes another program, wherein the committed state indicates that the transaction data is in the non-volatile memory and can be used when the computer system restarts or executes another program, and wherein the backup state indicates that the transaction data of the transaction is in the external memory can be used when the computer system restarts or executes another program.

7. The method according to claim 1, wherein the external memory is a hard disk drive (HDD), a solid state drive (SDD), or combinations thereof, and the non-volatile memory is a phase change memory (PCM), a resistive random access memory (RRAM), a magnetic random access memory (A/WANT), a ferroelectric random access memory (FRAM), or combinations thereof.

8. A computer system, comprising:
a non-volatile memory configured to store data; and
a processor coupled to the non-volatile memory and configured to:
receive a transaction processing request, wherein the transaction processing request carries transaction data of a transaction;
record status information of the transaction in the non-volatile memory, wherein the status information of the transaction comprises a transaction status, a transaction identifier, and an address that are each allocated to the transaction according to the transaction processing request, wherein the transaction status is an uncommitted state, and wherein the uncommitted state indicates that not all the transaction data is written to the non-volatile memory;
write the transaction data to the non-volatile memory according to the address;
modify the transaction status of the transaction to a committed state according to the transaction identifier, wherein the committed state indicates that all the transaction data of the transaction is written to the non-volatile memory, and not all the transaction data is written to an external memory of the computer system;
write the transaction data to the external memory of the computer system from the non-volatile memory; and
modify the transaction status of the transaction to a backup state according to the transaction identifier, wherein the backup state indicates that all the transaction data of the transaction is written to the external memory of the computer system, and wherein the transaction status indicates a write status distinguishing between uncommitted, committed to non-volatile memory, and backed up to external memory.

9. The computer system according to claim 8, wherein before modifying the transaction status of the transaction to the committed state according to the transaction identifier, the processor is further configured to:
determine, according to the status information of the transaction recorded in the non-volatile memory, that the transaction status of the transaction is the uncommitted state when the computer system restarts; and
delete the transaction data and the status information of the transaction.

10. The computer system according to claim 8, wherein after modifying the transaction status of the transaction to the committed state according to the transaction identifier, the processor is further configured to:
determine, according to the status information of the transaction recorded in the non-volatile memory, that the transaction status of the transaction is the committed state when the computer system restarts; and
write the transaction data to the external memory of the computer system from the non-volatile memory.

11. The computer system according to claim 8, wherein after modifying the transaction status of the transaction to the backup state according to the transaction identifier, the processor is further configured to delete the transaction data of the transaction.

12. The computer system according to claim 8, wherein writing the transaction data is written to non-volatile memory and the external memory without writing to a log area.

13. The computer system according to claim 8, wherein the uncommitted state indicates that the transaction data of the transaction cannot be used when the computer system restarts or executes another program, wherein the committed state indicates that the transaction data is in the non-volatile memory and can be used when the computer system restarts or executes another program, and wherein the backup state indicates that the transaction data of the transaction is in the external memory can be used when the computer system restarts or executes another program.

14. The computer system according to claim 8, wherein the external memory is a hard disk drive (HDD), a solid state drive (SDD), or combinations thereof, and the non-volatile memory is a phase change memory (PCM), a resistive random access memory (RRAM), a magnetic random access memory (A/WANT), a ferroelectric random access memory (FRAM), or combinations thereof.

15. A computer program product comprising one or more computer-executable instructions, wherein the one or more computer-executable instructions, when executed on a processor of a computer system, cause the computer system to carry out:
  receiving a transaction processing request, wherein the transaction processing request carries transaction data of a transaction;
  recording status information of the transaction in a non-volatile memory, wherein the status information of the transaction comprises a transaction status, a transaction identifier, and an address that are allocated to the transaction according to the transaction processing request, wherein the transaction status is an uncommitted state, and wherein the uncommitted state indicates that not all the transaction data is written to the non-volatile memory;
  writing the transaction data to the non-volatile memory according to the address;
  modifying the transaction status of the transaction to a committed state according to the transaction identifier, wherein the committed state indicates that all the transaction data of the transaction is written to the non-volatile memory and not all the transaction data is written to an external memory of the computer system;
  writing the transaction data to the external memory of the computer system from the non-volatile memory; and
  modifying the transaction status of the transaction to a backup state according to the transaction identifier, wherein the backup state indicates that all the transaction data of the transaction is written to the external memory of the computer system, and wherein the transaction status indicates a write status distinguishing between uncommitted, committed to non-volatile memory, and backed up to external memory.

16. The computer program product according to the claim 15, wherein the computer-executable instructions further cause the computer system to carry out:
  determining, according to the status information of the transaction recorded in the non-volatile memory, that the transaction status of the transaction is the uncommitted state when the computer system restarts before the modifying the transaction status of the transaction to the committed state according to the transaction identifier; and
  deleting the transaction data and the status information of the transaction.

17. The computer program product according to the claim 15, wherein the computer-executable instructions further cause the computer system to carry out:
  determining, according to the status information of the transaction recorded in the non-volatile memory, that the transaction status of the transaction is the committed state when the computer system restarts after the modifying the transaction status of the transaction to the committed state according to the transaction identifier; and
  writing the transaction data to the external memory of the computer system from the non-volatile memory.

18. The computer program product according to the claim 15, wherein the computer-executable instructions further cause the computer system to carry out deleting the transaction data of the transaction after the modifying the transaction status of the transaction to the backup state according to the transaction identifier.

19. The computer program product according to the claim 15, wherein writing the transaction data is written to non-volatile memory and the external memory without writing to a log area.

20. The computer program product according to the claim 15, wherein the uncommitted state indicates that the transaction data of the transaction cannot be used when the computer system restarts or executes another program, wherein the committed state indicates that the transaction data is in the non-volatile memory and can be used when the computer system restarts or executes another program, and wherein the backup state indicates that the transaction data of the transaction is in the external memory can be used when the computer system restarts or executes another program.

* * * * *